(12) United States Patent
Nikolai

(10) Patent No.: US 9,348,777 B2
(45) Date of Patent: May 24, 2016

(54) HARDWARE APPARATUS FOR A SYSTEM, SYSTEM AND MEMORY ACCESS METHOD

(71) Applicant: Robert Bosch GmbH, Stuttgart (DE)

(72) Inventor: Horst-Dieter Nikolai, Michelstadt (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 13/903,865

(22) Filed: May 28, 2013

(65) Prior Publication Data

US 2013/0326107 A1     Dec. 5, 2013

(30) Foreign Application Priority Data

May 29, 2012 (DE) .......................... 10 2012 010 558

(51) Int. Cl.
*G06F 13/28* (2006.01)
(52) U.S. Cl.
CPC .................................. *G06F 13/282* (2013.01)
(58) Field of Classification Search
CPC ................................................... G06F 13/282
USPC .......................................... 710/22, 29, 308
See application file for complete search history.

(56) References Cited

U.S. PATENT DOCUMENTS

| | | | | |
|---|---|---|---|---|
| 5,655,151 A * | 8/1997 | Bowes et al. | ................ | 710/22 |
| 5,752,081 A * | 5/1998 | Jirgal | ................ | 710/22 |
| 5,812,876 A * | 9/1998 | Welker et al. | ................ | 710/22 |
| 6,055,583 A | 4/2000 | Robbins | | |
| 6,701,388 B1 * | 3/2004 | Smith et al. | ................ | 710/22 |
| 2008/0222317 A1 * | 9/2008 | Go et al. | ................ | 710/22 |

FOREIGN PATENT DOCUMENTS

DE     38 30 723 A1     3/1990

* cited by examiner

*Primary Examiner* — Glenn A Auve
(74) *Attorney, Agent, or Firm* — Maginot, Moore & Beck LLP

(57) ABSTRACT

A hardware apparatus for a system comprises an interface and a direct memory access device. The interface is configured to connect the hardware apparatus to a system bus, which the hardware apparatus can use to communicate with a central control unit in the system and/or with another hardware apparatus in the system. The direct memory access device is configured to directly access a main memory of the central control unit, and to set an identifier for data flow control in the main memory of the central control unit when the direct memory access device has terminated direct access to a main memory of the system.

8 Claims, 2 Drawing Sheets

HARDWARE APPARATUS FOR A SYSTEM, SYSTEM AND MEMORY ACCESS METHOD

This application claims priority under 35 U.S.C. §119 to patent application no. DE 10 2012 010 558.4, filed on May 29, 2012 in Germany, the disclosure of which is incorporated herein by reference in its entirety.

BACKGROUND

The present disclosure relates to a hardware apparatus for a system, to a system and to a memory access method.

A system in the form of a computer usually has a central control unit (CPU=Central Processing Unit) which can access a main memory. The central control unit is connected to a system bus, such as a PCI bus (PCI=Peripheral Component Interconnect), a PCI-X bus, a PCIe bus (PCI express bus), etc., and is connected via the latter to other hardware apparatuses of the computer. Such hardware apparatuses are an integrated circuit, for example, which may be a field programmable gate array (FPGA), in particular. If the hardware apparatuses have master capability, which means that they themselves can control other appliances or apparatuses, then they can use direct memory access (DMA) to send and receive data, particularly in the form of data packets, independently without the central control unit being used in the process. This relieves the load on the central control unit for data flow control in the computer.

As standard, the data flow control is implemented by reading status registers in the hardware apparatus, such as the field programmable gate array (FPGA). This requires a read cycle on the system bus. Such read cycles on the system bus last an extremely long time, however. This is accompanied by the central control unit being stopped for the time of the read cycles. This takes up valuable computation time which would otherwise be available to the central control unit.

The loading of the central control unit with respect to time in the prior art is calculated from the fact that a single read cycle on the bus lasts between 0.6 μs and 1 μs, depending on system components. This time may also be much longer, since, in the case of a PCI bus, in the worst case, a single access operation can even also be extended by up to 7.6 μs if the bus is occupied by ongoing direct memory access (DMA) with a maximum waiting time (waiting time counter (latency counter)→255*30 μs).

DE 38 30 723 A1 describes a device for direct memory access (DMA) to a main memory of a computer which is connected to a system bus.

Furthermore, it is known practice to perform data flow control using interrupt requests. However, such a solution is not possible or meaningful in every system or computer. In addition, such a solution takes up even more computation power. A further problem is that there is usually also not enough free interrupt line available.

It is therefore an object of the present disclosure to provide a hardware apparatus for a system, a system and a memory access method which can be used to solve the aforementioned problems.

In particular, the aim is to provide a hardware apparatus for a system, a system and a memory access method in which the central control unit (CPU) is relieved of load for the data flow control. This object is achieved by a hardware apparatus as described herein.

SUMMARY

The hardware apparatus comprises an interface for connecting the hardware apparatus to a system bus which the hardware apparatus can use to communicate with a central control unit in the system and/or with another hardware apparatus in the system, and a direct memory access device for directly accessing a main memory of the central control unit, wherein the direct memory access device is also designed to set an identifier in the main memory for data flow control when the direct memory access device has terminated direct access to a main memory of the system.

Using the hardware apparatus described, the data flow control does not require any further access by the central control unit (CPU) to the bus. As a result, the hardware apparatus described results in considerable relief of load on the central control unit with respect to time, since read access operations in the main memory, which may be a synchronous dynamic random access memory (SDRAM), lasts only between 20 μs and 100 μs, depending on the system.

The direct memory access device is preferably designed to set an identifier separately for each direct memory access channel.

Preferably, hardware apparatus is a hardware apparatus having master capability.

The object is also achieved by a system as described herein. The system comprises a central control unit for controlling the system, a main memory, associated with the central control unit, for storing data which can be used for controlling the system, and at least one hardware apparatus which is connected to the central control unit via a system bus and can be set up to directly access the main memory associated with the central control unit, wherein the central control unit reads an identifier in the main memory for data flow control for the main memory.

The system attains the same advantages as are cited previously in relation to the hardware apparatus.

The central control unit is preferably also designed to reset the identifier in the main memory when it has read and/or edited the associated data in the main memory.

The central control unit may also be designed to check and reset the identifier in the main memory in order to check a cyclic update for data in the main memory that is performed by the at least one hardware apparatus.

The object is also achieved by a memory access method as described herein. The memory access method comprises the steps of: direct access to a main memory, which is associated with a central control unit in a system, by means of a hardware apparatus in the system, which hardware apparatus is connected to the central control unit via a system bus, and setting, at the end of the step of direct access, using the hardware apparatus, of an identifier in the main memory for data flow control.

The memory access method attains the same advantages as are cited previously in relation to the hardware apparatus.

The memory access method may also comprise the step of reading, using the central control unit, of the identifier in the main memory for data flow control.

The memory access method may also comprise the step of resetting, using the central control unit, of the identifier in the main memory when the central control unit has read and/or edited the associated data in the main memory.

The memory access method may also comprise the steps of: checking, using the central control unit, of the identifier in the main memory in order to check a cyclic update for data in the main memory which is performed by the at least one hardware apparatus, and resetting, using the central control unit, of the identifier in the main memory.

Further possible implementations of the disclosure also comprise combinations—not cited explicitly—of features or embodiments that are described above or below in respect of the exemplary embodiments. In this case, a person skilled in the art will also add individual aspects as improvements or additions to the respective basic form of the disclosure.

BRIEF DESCRIPTION OF THE DRAWINGS

The disclosure is described in more detail below using an exemplary embodiment and with reference to the accompanying drawing, in which.

DETAILED DESCRIPTION

In the figures, elements which are the same or have the same function are provided with the same reference symbols, unless stated otherwise.

Figure 1:
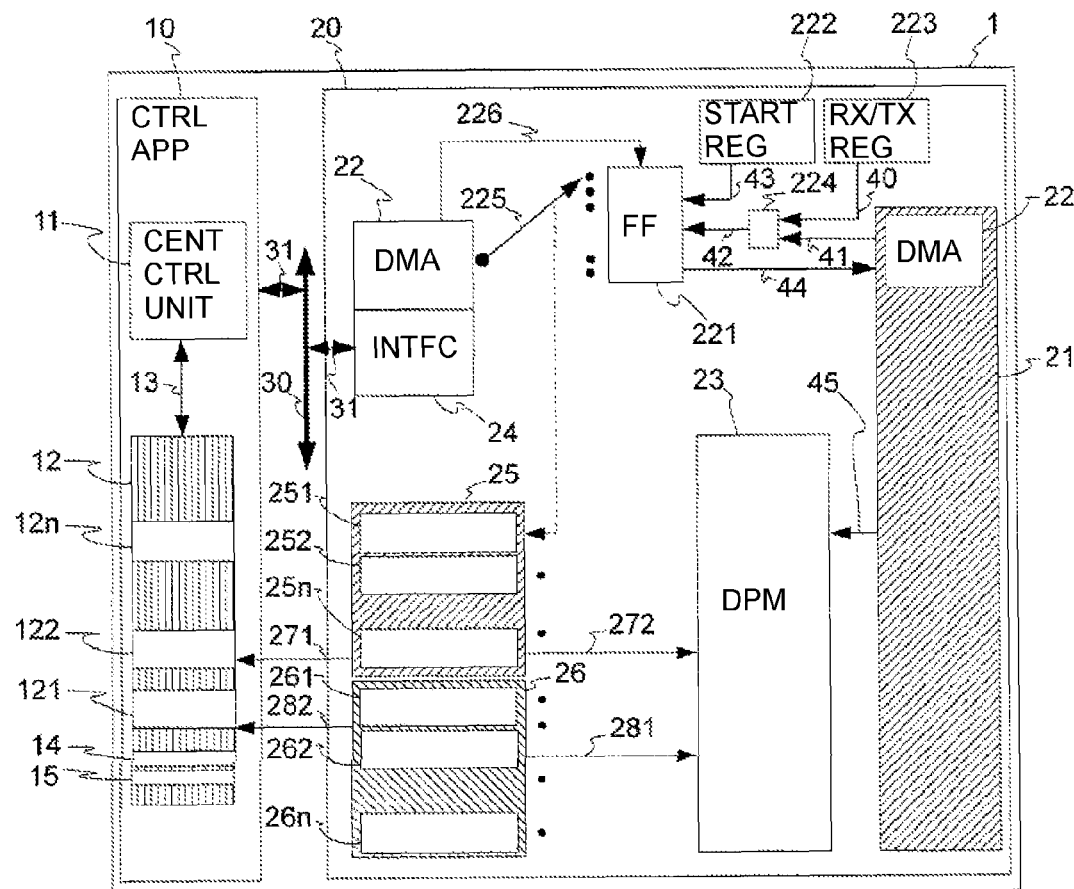
FIG. 1 shows a schematic block diagram of a system having a hardware apparatus based on a first exemplary embodiment.

FIG. 1 shows a system 1, which may be a computer, in particular. The system 1 has a control apparatus 10 and a hardware apparatus 20 which can communicate with one another via a system bus 30. The control apparatus 10 and the hardware apparatus 20 are each connected to the system bus 30 by means of a connecting line 31.

By way of example, the hardware apparatus 20 is an integrated circuit, which may be a field programmable gate array (FPGA), in particular. In particular, the hardware apparatus 20 may have Sercos III functionality, in which case the system 1 preferably also supports this functionality.

The system bus 30 may be a computer bus and, for example, is a PCI bus, PCIe bus, PCI-X bus, etc. (PCI=Peripheral Component Interconnect). The hardware apparatus 20 may be any PCI subscriber having master capability, PCIe subscriber having master capability, etc.

In FIG. 1, the control apparatus 10 has a central control unit 11 and a main memory 12 which are able to communicate with one another via a bus 13. In particular, the bus 13 is a front side bus (FSB). The main memory 12 is therefore associated with the central control unit 11. By way of example, the main memory 12 is a random access memory (RAM), particularly a dynamic random access memory (DRAM). The main memory 12 has memory areas 121, 122, . . . , 12n, which can also be called buffer 1, buffer 2, . . . , buffer n. The main memory 12 may also have at least one first identifier 14 and at least one second identifier 15 written in it as a ready identifier for direct memory access (DMA). This is described with even more precision later.

Also in FIG. 1, the hardware apparatus 20 has an application chip 21, having a direct memory access device 22, which is in the form of a direct memory access control logic chip, which can also be called DMA control logic. In addition, the hardware apparatus 20 also has a memory device 23, which can also be called DPM chip 23 (DPM=Dual Port Memory), which stores or is used to store the data from the hardware apparatus 20. The hardware apparatus 20 is connected to the connecting line 31 and hence to the system bus 30 and to all further apparatuses connected to the system bus 30 via an interface 24. FIG. 1 shows no such further apparatuses.

In addition, the hardware apparatus 20 in FIG. 1 has a plurality of direct memory access channels (DMA channels) which are implemented by means of a reception DMA control chip 25 and a transmission DMA control chip 26. The reception DMA control chip 25 is also called RX DMA control chip 25 and has a first reception control block 251, a second reception control block 252, . . . , and an n-th reception control block 25n, which can also be called RX DMA control block 1, RX DMA control block 2, . . . and RX DMA control block n. The transmission DMA control chip 26 can also be called TX DMA control chip 26 and has a first transmission control block 261, a second transmission control block 262, . . . and an n-th transmission control block 26n, which can also be called TX DMA control block 1, TX DMA control block 2, . . . and TX DMA control block n.

The reception control blocks 251 to 25n are each DMA reception channels which can be used by the hardware apparatus 20 to receive data from the main memory 12 by means of direct memory access or to read said data from the main memory 12. In this case, the data from the main memory 12 are written to the memory device 23. The transmission control blocks 261 to 26n are each DMA transmission channels which can be used by the hardware apparatus 20 to send data from the memory device 23 to the main memory 12 by means of direct memory access or to write said data to the main memory 12. It is possible for a plurality of the reception control blocks 251 to 25n and/or of the transmission control blocks 261 to 26n to be activated simultaneously by means of direct memory access request. The direct memory access device 22 executes the direct memory access requests in order. It is also possible for the DMA requests to be executed in prioritizable form.

In FIG. 1, the direct memory access device 22 also has associated DMA request flipflops 221, an associated control apparatus DMA start register 222 and an associated EN hardware apparatus RX/TX register 223.

The direct memory access device 22 scans the chips 25, 26, which is shown in FIG. 1 by means of an arrow 225. The scanning 225 is performed on the basis of a clock 226 which controls the timing of the DNA request flipflops 221. As a result of this, one of the relevant reception control blocks 251, 252, . . . , 25n transfers data from an appropriate memory area 121, 122, . . . , 12n of the main memory 12 to a destination address 272 of the memory device 23 on the basis of a particular source address, which is represented by the arrow 271. Alternatively, one of the transmission control blocks 261, 262, . . . , 26n transfers data from an appropriate source address 281 of the memory device 23 into the main memory 12 to a destination address 282.

The control apparatus DMA start register 222 can be used by the control apparatus 10 to initiate reception direct memory access (RX direct memory access) by the hardware apparatus 20. In addition, the control apparatus DMA start register 222 can be used by the control apparatus 10 to initiate transmission direct memory access (TX direct memory access) by the hardware apparatus 20.

The EN hardware apparatus RX/TX register 223 comprises an EN hardware apparatus RX register and an EN hardware apparatus TX register. The hardware apparatus 20 can independently initiate direct memory access when the EN hardware apparatus RX/TX register 223 has associated bits set therefor as appropriate.

In FIG. 1, an output 40 from the register 223 and events 41 for the direct memory access device 22 are routed via an AND gate 224. An output 42 from the AND gate 224 is supplied together with an output 43 from the register 222 to the DMA request flipflops 221. An output 44 from the DMA request flipflops 221 is supplied as direct memory access status (DMA status) to the direct memory access device 22. The application chip 21 can access the memory device 23 via the connection 45.

Figure 2:
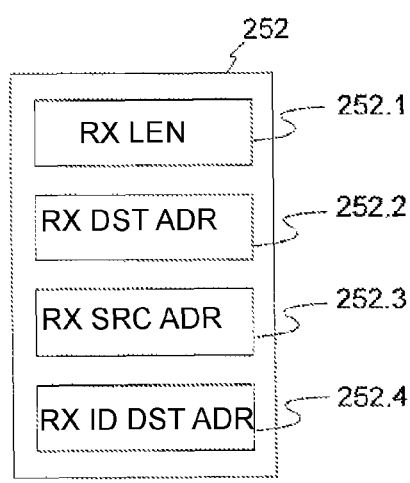
FIG. 2 shows a schematic block diagram of a reception control block for direct memory access for a hardware apparatus based on the first exemplary embodiment.

FIG. 2 shows an example of the design of the reception control block 252, that is to say of the direct access channels for receiving data from the hardware apparatus 20 to the main memory 12.

The reception control block 252 comprises the reception length 252.1 and the three address pointers: reception data destination address 252.2, reception data source address 252.3 and reception identifier destination address 252.4.

The reception length 252.1 indicates the length of the data to be transferred between the main memory 12 and the memory device 23, particularly the number of bytes. The address pointer reception data destination address 252.2 indicates the destination address for the data in the memory device 23. The address pointer reception data source address 252.3 indicates the source address for the data in the main memory 12. The address pointer reception identifier destination address 252.4 indicates the destination address for the second identifier 15 in the main memory 12. The second identifier 15 in this case indicates whether reception direct memory access to the main memory 12 has taken place and whether the reception direct memory access is complete. A data value not equal to 0 is in this case indicated using the second identifier 15 as acknowledgement.

All of the other reception control blocks 251, 253, . . . , 25*n* have the same design as the reception control block 252. In this case, each reception direct memory access has an associated separate second identifier 15.

Figure 3:
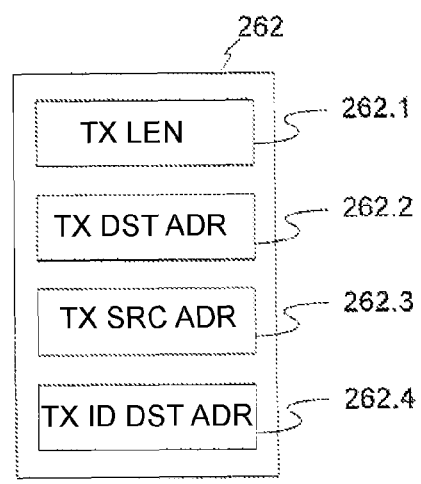
FIG. 3 shows a schematic block diagram of a transmission control block for direct memory access for a hardware apparatus based on the first exemplary embodiment.

FIG. 3 shows an example of the design of the transmission control block 262, that is to say of the direct access channels for sending data from the hardware apparatus 20 to the main memory 12. The transmission control block 262 comprises the transmission length 262.1 and the three address pointers: transmission data destination address 262.2, transmission data source address 262.3 and transmission identifier destination address 262.4.

The transmission length 262.1 indicates the length of the data to be transferred between memory device 23 and the main memory 12, particularly the number of bytes. The address pointer transmission data destination address 262.2 indicates the destination address for the data in the main memory 12. The address pointer transmission data source address 262.3 indicates the source address for the data in the memory device 23. The address pointer transmission identifier destination address 262.4 indicates the destination address for the first identifier 14 in the main memory 12. In this case, the first identifier 14 indicates whether transmission direct memory access to the main memory 12 has taken place and whether the transmission direct memory access is complete. A data value not equal to 0 is in this case indicated using the first identifier 14 as acknowledgement.

All of the other transmission control blocks 261, 263, . . . , 26*n* have the same design as the transmission control block 262. In this case, each reception direct memory access has an associated separate first identifier 14.

Figure 4:
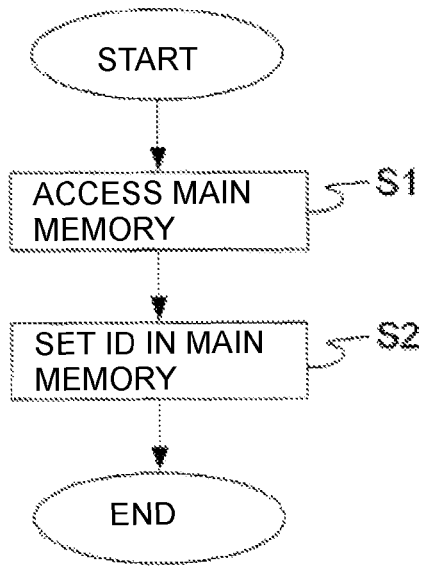
FIG. 4 shows a flowchart for a memory access method based on the first exemplary embodiment which is performed by the hardware apparatus.

FIG. 4 shows a memory access method which is performed by the hardware apparatus 20. Accordingly, after the start of the method, a step S1 involves the hardware apparatus 20, to be more precise its direct memory access device 22, carrying out direct access to the main memory 12. In this case, data from the hardware apparatus 20 are written to a particular memory area 121, 122, . . . , 12*n* of the main memory 12 or are read therefrom. The particular memory area 121, 122, . . . , 12*n* of the main memory 12 is in this case denoted by the associated address pointer in the respective reception control block 251, 252, . . . , 25*n* or the transmission control block 261, 262, . . . , 26*n*, which carries out the direct access to the main memory 12, the direct memory access. Next, a step S2 involves the direct memory access device 22 setting the relevant identifier 14, 15 in the main memory 12, as denoted by the associated address pointer in the respective reception control block 251, 252, . . . , 25*n* or the transmission control block 261, 262, . . . , 26*n*. After that, the method is at an end for the hardware apparatus 20.

The first identifier(s) 14 and the second identifier(s) 15 can be used by the central control unit 11 for data flow control in the main memory 12, as described below.

Figure 5:
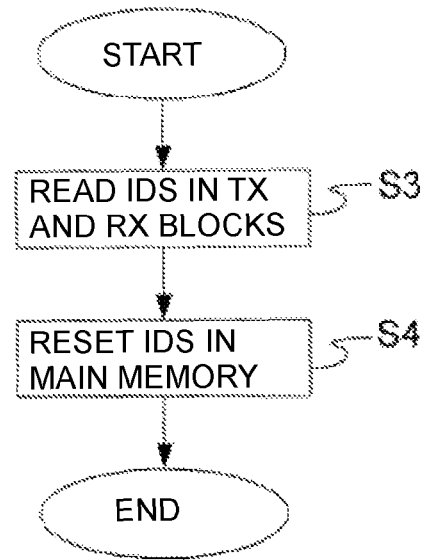
FIG. 5 shows a flowchart for a portion of a memory access method based on the first exemplary embodiment which is performed by the central control apparatus.

FIG. 5 shows a portion of the memory access method which is performed in the control apparatus 10.

After the start of this method portion, a step S3 involves the central control unit 11 reading the first identifiers 14 in the transmission control blocks 261, 262, . . . , 26*n* and/or the second identifiers 15 in the reception control blocks 251, 252, . . . , 25*n*. The central control unit 11 then proceeds to a step S4.

Step S4 involves the central control unit 11 resetting the relevant first identifier 14 and/or second identifier 15 in the main memory 12 after the central control unit 11 has read the relevant memory areas 121, 122, . . . , 12*n* of the main memory 12 and/or has edited the data stored therein. Next, preferably after the data has been edited, the central control unit 11 provides clearance for the next transfer of data from or to the main memory 12. After that, the method is at an end for the central control unit 11.

In this way, data flow control can be carried out in the main memory 12 without the central control unit 11 accessing the system bus 30.

On the basis of this exemplary embodiment, each DMA channel is parameterized using four entries. These entries are a pointer to the source address, a pointer to the destination address and a length entry and additionally a further address pointer. This further address pointer points to a memory location in the fast memory of the central control unit 11, the main memory 12. The DMA logic chip, to be more precise the direct memory access device 22, starts further direct data access (DMA) after termination of a respective data transfer, said further direct data access storing a ready identifier, such as the first identifier 14 and/or the second identifier 15. This identifier (EN) 14, 15 is interrogated (polled) by the central control unit 11 and reset after the data have been edited.

Figure 6:
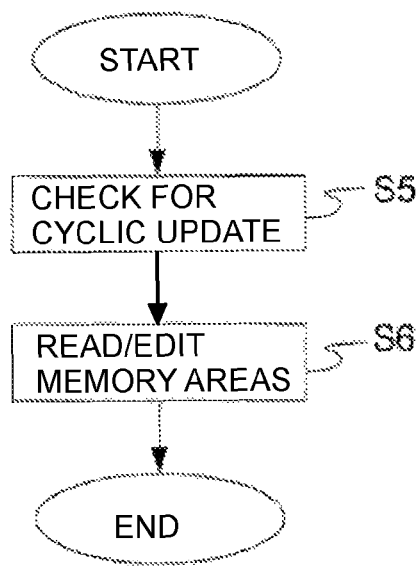
FIG. 6 shows a flowchart for a portion of a memory access method based on a second exemplary embodiment which is performed by the central control apparatus.

FIG. 6 shows a portion of a memory access method based on a second exemplary embodiment. In this exemplary embodiment, the system 1 is of the same design as that shown in FIG. 1. In addition, the hardware apparatus 20 performs its portion of the memory access method in the same way as shown in FIG. 4 and described previously. By contrast, that portion of the memory access method which is performed by the central control unit 11 is different in this exemplary embodiment than in the first exemplary embodiment.

On the basis of FIG. 6, a step S5 involves a check being performed in the central control unit 11, after the beginning of its portion of the memory access method, to determine whether the first identifier(s) 14 and/or the second identifier(s) 15 indicate that a cyclic update for the data in the main memory 12 has been performed by the hardware apparatus 20.

In this case, the sequence carried out by the central control unit 11 and the sequence carried out by the application chip 21 take place in sync. For example, this can be effected by virtue of the application chip 21 generating a cyclic interrupt for the control apparatus 10, particularly the central control unit 11. Previously, the application chip 21 has independently interchanged the process data, possibly in both directions. If the response in step S5 is YES, the central control unit 11 reads the relevant memory areas 121, 122, . . . , 12n of the main memory 12 and/or edits the data. After that, preferably after the data have been edited, the central control unit 11 resets the relevant first identifier 14 and/or second identifier 15 in the main memory 12 and provides clearance for the next transfer of data from or to the main memory 12. After that, the method is at an end for the central control unit 11.

Accordingly, the control apparatus 10 now only needs to process the data further in step S5. In order to supervise whether the data have actually been updated by the application chip 21, the central control unit 11 can check and/or reset the flags 14 and 15.

In this way, the central control unit 11 can check a cyclic update for data in the main memory 12 which are transmitted independently by the hardware apparatus 20 using direct memory access (DMA). The data may be cyclic Sercos III data, for example.

All of the refinements of the hardware apparatus, the system and the memory access method which have been described previously can be used individually or in all possible combinations. In particular, all of the refinements and functions of the first and second exemplary embodiments can be combined arbitrarily. In addition, particularly the following modifications are conceivable.

The portions shown in the figures are shown schematically and may differ in terms of the precise embodiment from the forms shown in the figures, so long as the functions thereof which have been described previously are ensured.

In the previously described system 1 and the memory access method supplied thereby, subscribers having master capability, such as the hardware apparatus 20, send and receive data packets independently using direct memory access (DMA). In this context, the respective Done message/acknowledgement from the direct memory access is part of the data flow controls.

By way of example, the control blocks 251 to 25n and/or the control blocks 261 to 26n may each comprise 16 control blocks, that is to say that n has a value of 16. Alternatively, a different number of control blocks 251 to 25n and/or of control blocks 261 to 26n is possible.

What is claimed is:

1. A hardware apparatus for a system, comprising:
   an interface configured to connect the hardware apparatus to a system bus, the system bus being usable by the hardware apparatus to communicate with at least one of (i) a central control unit in the system, and (ii) another hardware apparatus in the system; and
   a direct memory access device configured (i) to directly access a main memory of the central control unit, (ii) to set an identifier in the main memory of the central control unit for data flow control when the direct memory access device has terminated direct access to a main memory of the system, and (iii) reset the identifier in the main memory in response to the central control unit executing an operation for at least one of (i) reading associated data in the main memory, and (ii) editing the associated data in the main memory.

2. The hardware apparatus according to claim 1, wherein the direct memory access device is configured to set the identifier separately for each direct memory access channel of a plurality of direct memory access channels of the main memory of the central control unit.

3. The hardware apparatus according to claim 1, wherein the hardware apparatus is a hardware apparatus with master capability.

4. A system, comprising:
   a central control unit configured to control the system;
   a main memory associated with the central control unit and configured to store data used for controlling the system; and
   at least one hardware apparatus connected to the central control unit via a system bus and configured to directly access the main memory,
   wherein the main memory includes an identifier for data flow control, and
   wherein the central control unit is configured to:
      read the identifier in the main memory; and
      reset the identifier in the main memory in response to the central control unit executing an operation for at least one of (i) reading associated data in the main memory, and (ii) editing the associated data in the main memory.

5. The system according to claim 4, wherein:
   the central control unit is configured to check and to reset the identifier in the main memory in order to check a cyclic update for data in the main memory, and
   the cyclic update is performed by the at least one hardware apparatus.

6. A memory access method, comprising:
   directly accessing a main memory associated with a central control unit in a system, with a hardware apparatus in the system, the hardware apparatus being connected to the central control unit via a system bus;
   setting an identifier in the main memory for data flow control using the hardware apparatus, at an end of the directly accessing the main memory; and
   resetting the identifier in the main memory using the central control unit in response the central control unit executing an operation for at least one of (i) reading associated data in the main memory, and (ii) editing the associated data in the main memory.

7. The memory access method according to claim 6, further comprising:
   reading the identifier in the main memory using the central control unit.

8. The memory access method according to claim 6, further comprising:
   checking the identifier in the main memory in order to check a cyclic update for data in the main memory using the central control unit, the cyclic update being performed by the at least one hardware apparatus; and
   resetting the identifier in the main memory using the central control unit.

* * * * *